(12) United States Patent
LeFebvre et al.

(10) Patent No.: US 11,726,272 B2
(45) Date of Patent: Aug. 15, 2023

(54) OUTDOOR RATED FIBER OPTIC JUMPER CABLE

(71) Applicant: CommScope Technologies LLC, Hickory, NC (US)

(72) Inventors: Anthony Leonard LeFebvre, Edina, MN (US); Thomas Marcouiller, Shakopee, MN (US); Oscar Fernando Bran de León, Belle Plaine, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/162,291

(22) Filed: Jan. 29, 2021

(65) Prior Publication Data

US 2021/0239918 A1  Aug. 5, 2021

Related U.S. Application Data

(60) Provisional application No. 62/968,757, filed on Jan. 31, 2020.

(51) Int. Cl.
*G02B 6/38* (2006.01)
(52) U.S. Cl.
CPC ......... *G02B 6/3898* (2013.01); *G02B 6/3849* (2013.01); *G02B 6/3885* (2013.01); *G02B 6/3891* (2013.01); *G02B 6/3893* (2013.01); *G02B 6/3894* (2013.01)

(58) Field of Classification Search
None
See application file for complete search history.

(56) References Cited

U.S. PATENT DOCUMENTS

| 4,801,191 | A | 1/1989 | Nakai et al. |
|---|---|---|---|
| 7,338,214 | B1 | 3/2008 | Gurrer et al. |
| 7,645,162 | B2 | 1/2010 | Kadar-Kallen et al. |
| 7,758,389 | B2 * | 7/2010 | Kadar-Kallen .... H01R 13/5202 439/660 |
| 8,162,546 | B1 | 4/2012 | Mumm et al. |
| 8,556,520 | B2 * | 10/2013 | Elenbaas ................ G02B 6/387 385/53 |

(Continued)

FOREIGN PATENT DOCUMENTS

| EP | 2 354 825 A1 | 8/2011 |
|---|---|---|
| EP | 2 302 431 B1 | 3/2019 |

(Continued)

OTHER PUBLICATIONS

International Search Report and Written Opinion for Application No. PCT/US2021/015738 dated May 26, 2021.

(Continued)

*Primary Examiner* — Jerry Rahll
(74) *Attorney, Agent, or Firm* — Merchant & Gould P.C.

(57) ABSTRACT

The present disclosure relates generally to a fiber optic jumper including a fiber optic cable that extends between first and second cable ends. The fiber optic cable includes a cable jacket containing at least first and second optical fibers. The fiber optic jumper also includes an optical transceiver module directly terminated at the first end of the fiber optic cable, and at least one fiber optic connector directly terminated at the second end of the fiber optic cable. The fiber optic jumper is outdoor rated for temperatures ranging from minus 40 to 75 degrees Celsius.

21 Claims, 6 Drawing Sheets

(56) References Cited

U.S. PATENT DOCUMENTS

| | | | |
|---|---|---|---|
| 2007/0036489 A1* | 2/2007 | Grzegorzewska | H01R 13/5202 385/86 |
| 2011/0019998 A1* | 1/2011 | Wong | G02B 6/4246 398/41 |
| 2013/0243438 A1 | 9/2013 | Tang et al. | |
| 2014/0064672 A1 | 3/2014 | Elenbaas | |
| 2014/0328560 A1* | 11/2014 | Ahmed | G02B 6/4477 385/87 |
| 2016/0334587 A1* | 11/2016 | Isenhour | G02B 6/3888 |
| 2017/0184798 A1* | 6/2017 | Coenegracht | G02B 6/3849 |
| 2019/0025516 A1* | 1/2019 | Lichoulas | G02B 6/4403 |
| 2020/0310046 A1* | 10/2020 | Kanai | G02B 6/4471 |

FOREIGN PATENT DOCUMENTS

| | | |
|---|---|---|
| WO | 2014/197894 A1 | 12/2014 |
| WO | 2015/028433 A1 | 3/2015 |
| WO | 2015/120365 A1 | 8/2015 |
| WO | 2015/144883 A1 | 10/2015 |

OTHER PUBLICATIONS

QSFP+ to 8 LC AOC Cable, FiberOpticCable.com, 2 pages (Admitted as Prior Art as of Oct. 21, 2019).

* cited by examiner

OUTDOOR RATED FIBER OPTIC JUMPER CABLE

CROSS-REFERENCE TO RELATED APPLICATION

This application claims the benefit of U.S. Provisional Application No. 62/968,757, filed Jan. 31, 2020, and titled "OUTDOOR RATED FIBER OPTIC JUMPER CABLE" the disclosure of which is hereby incorporated herein by reference.

BACKGROUND

Telecommunication systems often employ fiber optic telecommunication cables for providing enhanced data transmission rates. For certain applications, optical transceiver modules are used to convert electrical signals to optical signals that are transmitted over fiber optic cables, and to convert optical signals from fiber optic cables to electrical signals used by active equipment.

SUMMARY

The present disclosure relates generally to a fiber optic jumper including a fiber optic cable that extends between first and second cable ends. The fiber optic cable includes a cable jacket containing at least first and second optical fibers. The fiber optic jumper also includes an optical transceiver module directly terminated at the first end of the fiber optic cable, and at least one fiber optic connector directly terminated at the second end of the fiber optic cable. The fiber optic jumper is outdoor rated for temperatures ranging from minus 40 to 75 degrees Celsius.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the examples disclosed herein are based.

BRIEF DESCRIPTION OF THE DRAWINGS

The following drawings are illustrative of particular examples of the present disclosure and therefore do not limit the scope of the present disclosure. Examples of the present disclosure will herein be described in conjunction with the appended drawings, wherein like numerals denote like elements.

DETAILED DESCRIPTION

Various example aspects will be described in detail with reference to the drawings, wherein like reference numbers represent like parts and assemblies throughout the several views.

Figure 1:
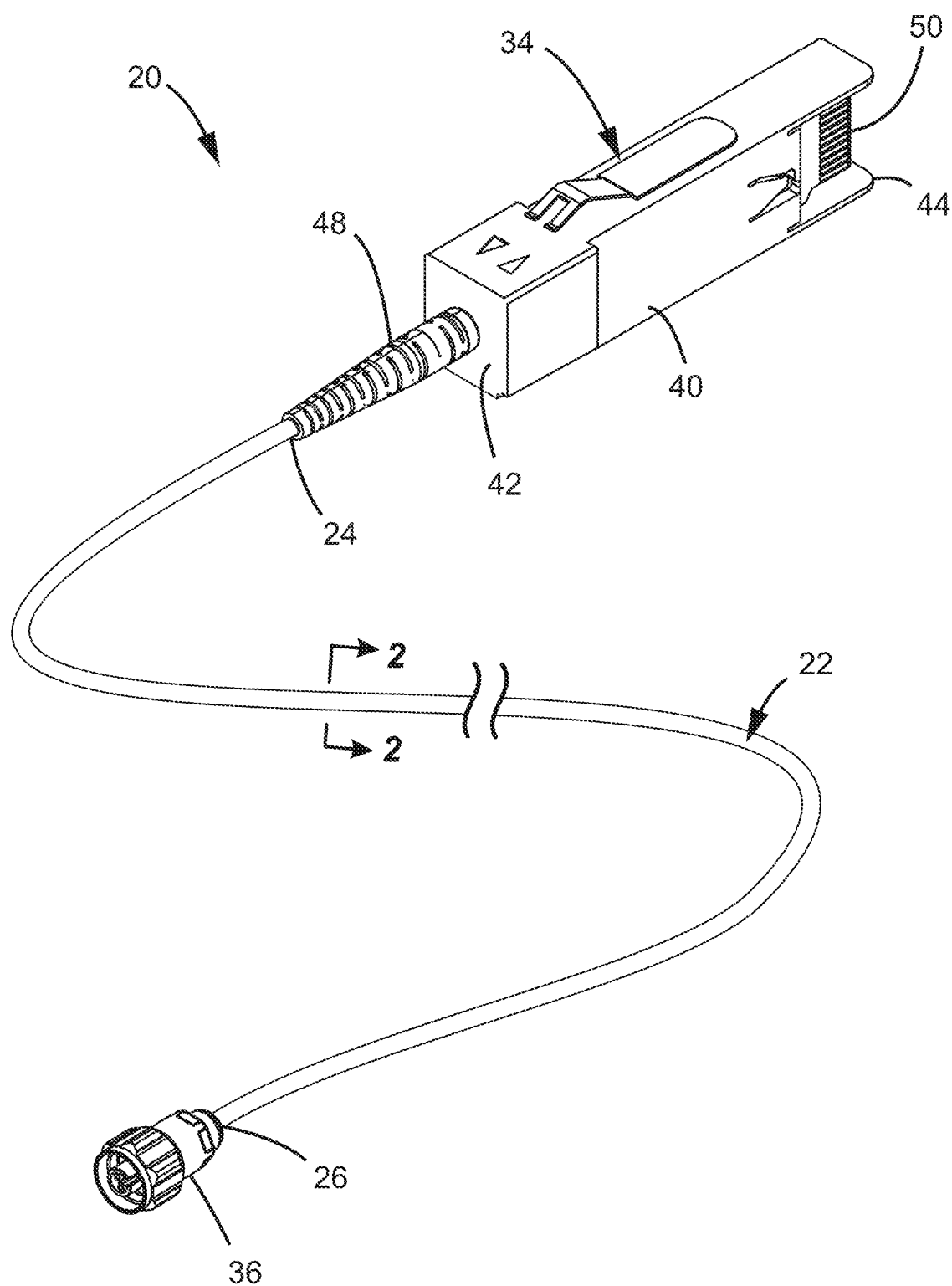
FIG. 1 depicts a fiber optic jumper cable in accordance with the principles of the present disclosure.
Figure 2:
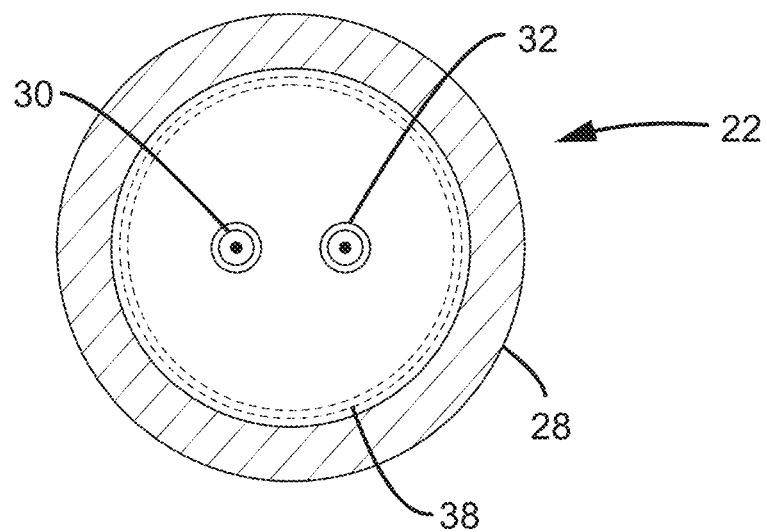
FIG. 2 is a cross-sectional view taken along section line 2-2 of FIG. 1.

FIG. 1 schematically depicts a fiber optic jumper 20 in accordance with the principles of the present disclosure. The fiber optic jumper 20 includes a fiber optic cable 22 that extends between first and second opposite cable ends 24, 26. As shown at FIG. 2, the fiber optic cable includes a cable jacket 28 containing at least first and second optical fibers 30, 32. The fiber optic jumper 20 includes an optical transceiver module 34 directly terminated at the first end 24 of the fiber optic cable 22. The fiber optic jumper 20 also includes at least one fiber optic connector 36 terminated at the second end 26 of the fiber optic cable 22. The fiber optic jumper 20 is outdoor rated for temperatures ranging from minus 40 to 70 degrees Celsius and is Ultraviolet Light protected.

As used herein, directly terminated means that the optical transceiver module and/or the fiber optic connector are connected to the fiber optic cable 22 without any intermediate de-matable optical connections. For example, the optical fibers 30, 32 are preferably routed into the interior of the optical transceiver module 34 or the fiber optic connector 36 and optically connected thereto by an optical connection. In the case of the fiber optic connector 36, the optical fibers can be routed directly to a ferrule or ferrules of the fiber optic connector 36, or can be spliced to stub fibers corresponding to the ferrule or ferrules. In the case of the optical transceiver module 34, the optical fibers can be optically coupled to an optical transmitter or an optical receiver of the optical transceiver module 34 by an optical splice or by other connection techniques such as optical surface mount connections to a planar light circuit or other structure. As such, a direct termination is not intended to include an intentionally de-matable connection between the fiber optic cable 22 and the optical transceiver module 34 or the optical connector 36.

Referring to FIG. 2, the fiber optic cable 22 can include a tensile reinforcing element 38 such as a layer of fibrous reinforcing material which may include material such as fiberglass, Aramid yarn or other fibrous reinforcing materials. In certain examples, the optical fibers 30, 32 can be contained within a buffer tube positioned within the jacket 28 such that the tensile reinforcing element 38 is positioned between the buffer tube and the jacket 28, and is separated from the optical fibers 30, 32.

Figure 3:
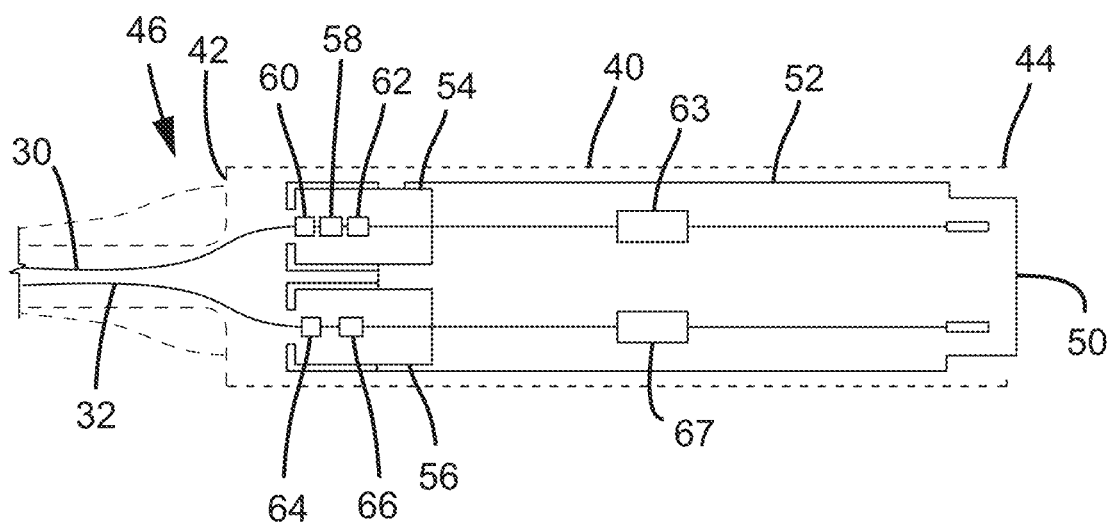
FIG. 3 is a schematic view showing an optical transceiver module suitable for use with the fiber optic jumper of FIG. 1.

As shown at FIG. 1, the optical transceiver module 34 includes a connector body or housing 40 that has a SFP (small form-factor pluggable) or QSFP form factor. The connector housing 40 has a first end 42 and a second end 44. As shown at FIG. 3, a cable anchoring and strain relief arrangement 46 is provided at the first end 42 of the connector housing 40 for securing the first end 24 of the fiber optic cable 22 to the first end 42 of the connector housing 40. In a preferred example, the cable anchoring and strain relief arrangement 46 includes a flexible boot 48 mounted to the first end 42 of the connector housing 44 for preventing the fiber optic cable 22 from violating bend radius requirements at the entrance location to the connector housing 40. In certain examples, the tensile reinforcing element 38 of the fiber optic cable 22 can be anchored to the first end 42 of the connector housing 40 by means such as a crimp, adhesive, a shape memory sleeve, or other techniques. An electrical interface 50 is provided at the second end 44 of the connector housing 40. The electrical interface 50 can include contacts for transmitting electrical signals to and from the optical transceiver module 34 and can also include one or more contacts for receiving electrical power used to power active components (optical-to-electrical converters and electrical-to-optical converters and other components) within the connector housing 40. In certain examples, the electrical contacts can include electrically conductive pads (e.g., card-edge contacts) supported on a printed circuit board.

The optical transceiver module 34 can include a transmit component (e.g., a light emitting component) and a receive component (e.g., a light receiving component). The transmit component and the receive component are electrically connected to separate electrical contacts at the electrical interface 50 of the optical transceiver module 34 (e.g., via electrical paths such as wires or tracings) and are optically coupled to the optical fibers 30, 32 of the fiber optic cable 22. The transmit component can include structure for converting electrical signals to optical signals (e.g., an electrical-to-optical converter) and can include a light emitter. Example structure can include a laser diode such as a Vertical Cavity Surface Emitter Laser (VCSEL) or an edge emitting laser. The receive component can include structure for converting optical signals into electrical signals (e.g., an optical-to-electrical converter). An example structure can include a photo diode.

In certain examples, the jumper 20 is configured to support 10 gigabit per second data rates and/or 25 gigabit per second data rates. In certain examples, the jumper 20 is adapted for use with Common Public Radio Interface (CPRI) and/or enhanced CPRI protocol for sending data between a remote radio unit and a base station or base band unit. In certain examples, the jumper can extend from the remote radio unit to the base station or base band unit, or can extend from the remote radio unit to an de-matable optical connection point (e.g., a hardened optical connection point) of a break-out location (e.g., a break-out terminal) which breaks out and provides connection points to optical fibers of a trunk cable coupled to the base station or base band unit.

FIG. 3 schematically depicts an internal assembly of the optical transceiver module 34 that is housed within the connector housing 40. The internal assembly includes a printed circuit board 52. A card edge connector is positioned at one end of the printed circuit board 52 and defines the electrical interface 50. A TOSA (transmitter optical subassembly) 54 and a ROSA (receiver optical subassembly) 56 are positioned adjacent an opposite end of the circuit board 52. In certain examples, the TOSA 54 and the ROSA 56 can be electrically connected to the circuit board 52 by flexible circuits.

The TOSA 54 can include an optical transmitter 58 and a lens 60. The TOSA 54 includes active electronics 62 for converting an electrical signal received by the optical transceiver module 34 via one of the contacts at the electrical interface 50 into an optical signal that is transmitted out of the optical transceiver module 34 by the optical transmitter 58 and the lens 60 to the optical fiber 30. The electrical signal can be received from a card edge connector provided at a connector receiver defining a port for receiving the second end 44 of the housing 40 (e.g., a plug end of the housing 40). In use, optical fiber 30 is optically connected to the optical transmitter 24 through the lens 60. The electrical signal received at the contact of the electrical interface 50 from the mated card edge connector is carried to the electronics 62 by a conductive path on the printed circuit board 52 and/or by flexible circuit. Further electronics 63 can be provided on the circuit board 52 for amplifying, filtering and/or otherwise processing the signals. The electrical signal is converted to an optical signal by the active electronics 62 of the TOSA 54 and is transmitted to the optical fiber 30 of the fiber optic cable 22 by the transmitter 58 through the lens 60.

The ROSA 56 includes an optical receiver 64 and active electronics 66 for converting an optical signal received by the optical transceiver module 34 from the second optical fiber 32 into an electrical signal that is output from the optical transceiver module 34 via one of the contacts of the electrical interface 50. In use, an optical signal received by the optical receiver 64 from the second optical fiber 32 is converted from an optical signal to an electrical signal by the active electronics 66. The electrical signal from the active electronics 66 is carried by a conductive path on the printed circuit board and/or on the flexible circuit to a contact at the electrical interface 50 where the signal can be output from the optical transceiver module 34 to an electrical card edge connector mated with the card edge connector of the printed circuit board 52 at the electrical interface 50. Further electronics 67 (e.g., active and/or passive electronics) can be provided on the circuit board for amplifying, filtering and/or otherwise processing signals.

Figure 4:
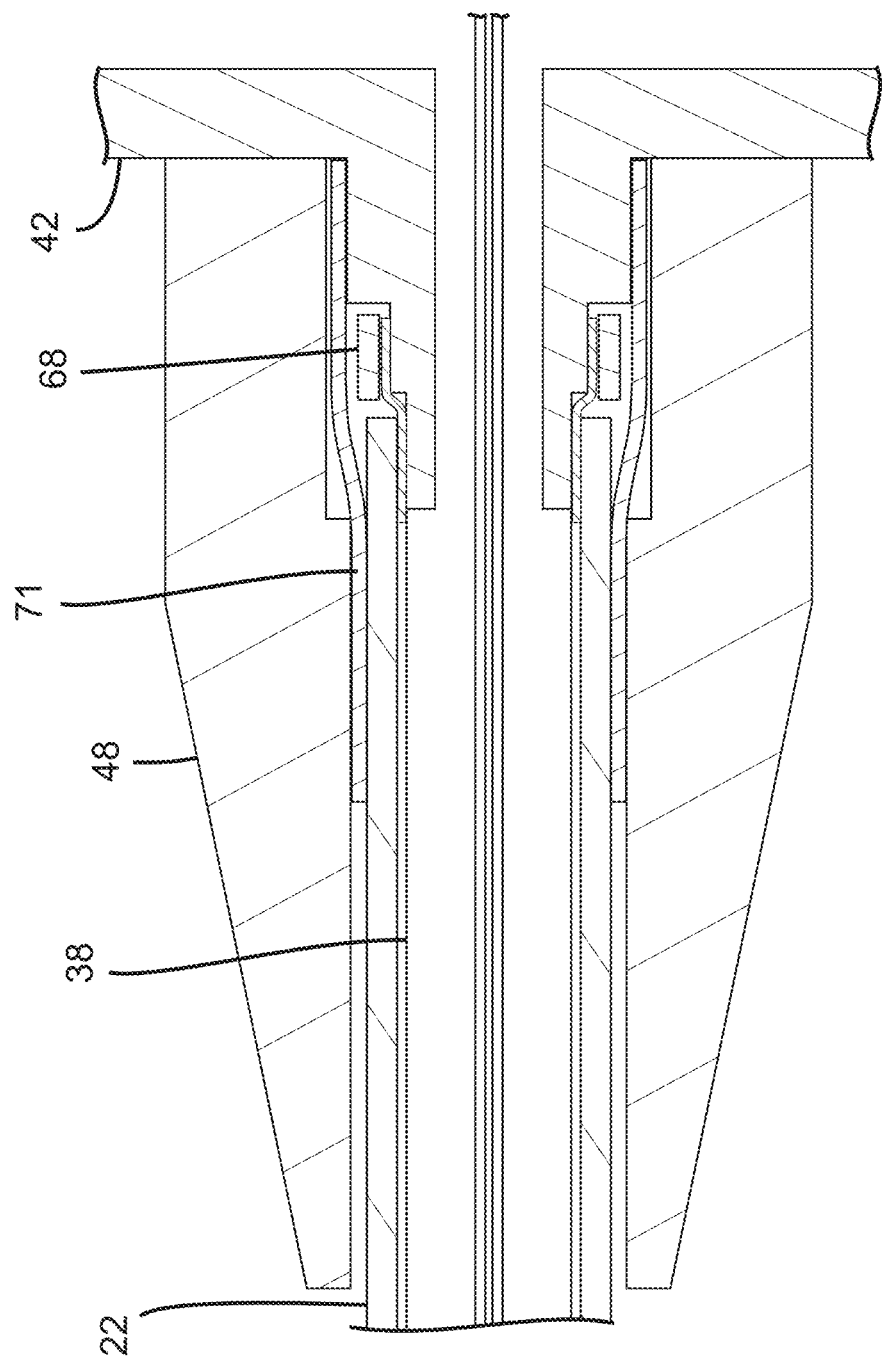
FIG. 4 is an enlarged view showing an example cable anchoring and sealing interface defined between the optical transceiver module and the fiber optic cable of the fiber optic jumper of FIG. 1.

FIG. 4 is an enlarged view showing an example cable anchoring and strain relief arrangement provided at the interface between the cable 22 and the rear end of the optical transceiver module 34. As depicted, the tensile reinforcing element 38 is secured to the connector housing 40 by a crimp sleeve 68. A shape memory sleeve 71 such as heat-shrink sleeve containing heat activated adhesive is mounted over the cable 22 and a stub portion of the connector housing 40 to provide environmental sealing between the cable 22 and the connector housing 40. The flexible boot 48 mounts over the shape memory sleeve 71 and provides bend radius protection to the cable 22 adjacent the rear end of the connector housing 40. The optical fibers 30, 32 are shown routed from the fiber optic cable 22 into the interior of the connector housing 40. The connector housing 40 can also be referred to as a module housing.

Figure 5:
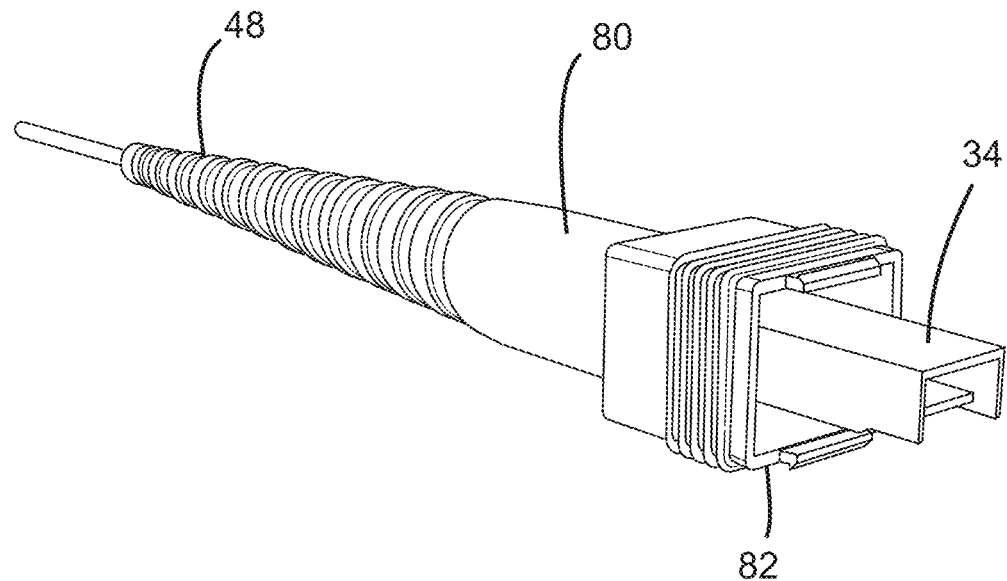
FIG. 5 is a perspective view showing an example protective shroud that can be used over the optical transceiver module of the fiber optic jumper of FIG. 1 to provide sealing and protection.
Figure 6:
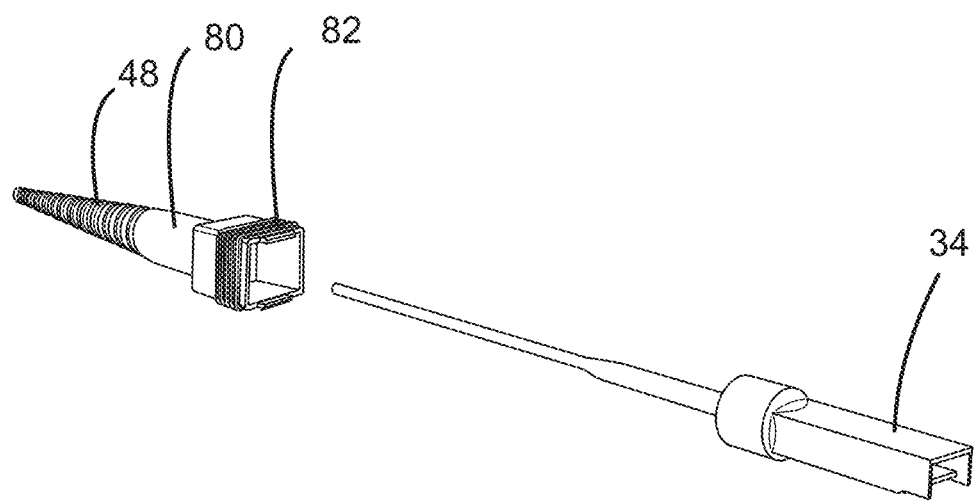
FIG. 6 shows the protective shroud of FIG. 5 retracted relative to the optical transceiver module.

FIGS. 5 and 6 depict an example protective shroud 80 adapted to mount over the optical transceiver module 34 to provide environmental sealing and protection of the optical transceiver module 34. In certain examples, the shroud 80 can include a front connection interface 82 for fastening with respect to a corresponding interface provided by a connector receiver adapted for receiving the plug end of the optical transceiver module 34. In certain examples, the flexible boot 48 can be integrated with the protective shroud 80. In certain examples, the protective shroud 80 can be slid relative to the optical transceiver module 34 to provide access to the optical transceiver module 34. In certain examples, a sealing structure such as a gasket or other structure can be incorporated into the boot to provide sealing between the protective shroud 80 and the cable 22.

Figure 7:
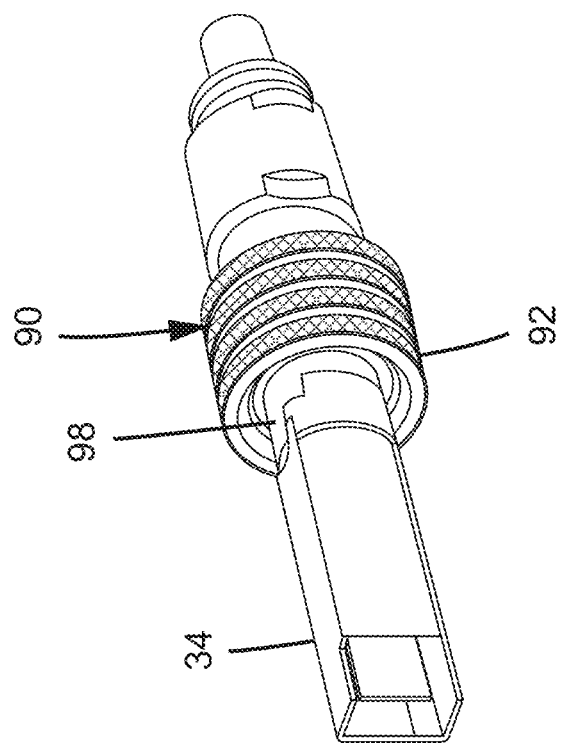
FIG. 7 depicts an example hardened configuration for the optical transceiver module of the fiber optic jumper of FIG. 1.
Figure 7:
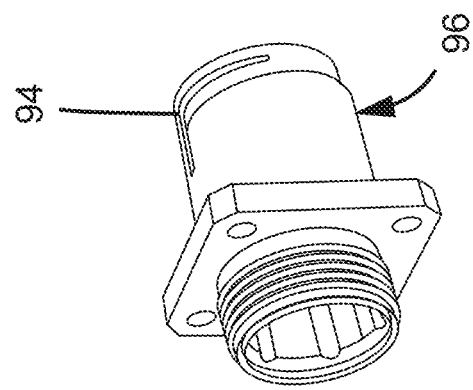

FIG. 7 depicts the optical transceiver module 34 integrated with respect to a hardened connector arrangement 90. The hardened connector arrangement 90 can include a fastener 92 adapted for interlocking with a corresponding fastening structure 94 provided on a connector receiver 96 adapted to receive and electrically connect with respect to the plug end of the optical transceiver module 34. The hardened connector arrangement 90 can include an inner body 98 fixed relative to the connector housing 40 of the transceiver module 34. In certain examples, the cable 22 can couple to the inner body 98. The fastener 92 mounts over the inner body 98. In certain examples, fastener 92 can be a push-pull connector, a threaded connector, a bayonet-style connector or other type of connector. In certain examples, environmental sealing such as an O-ring seal can be integrated with the interior of the fastener or provided at the connector receiver 96 for providing environmental sealing with respect to the hardened connector arrangement 90 and the connector receiver 96 when the two components are mated together.

Figure 8:
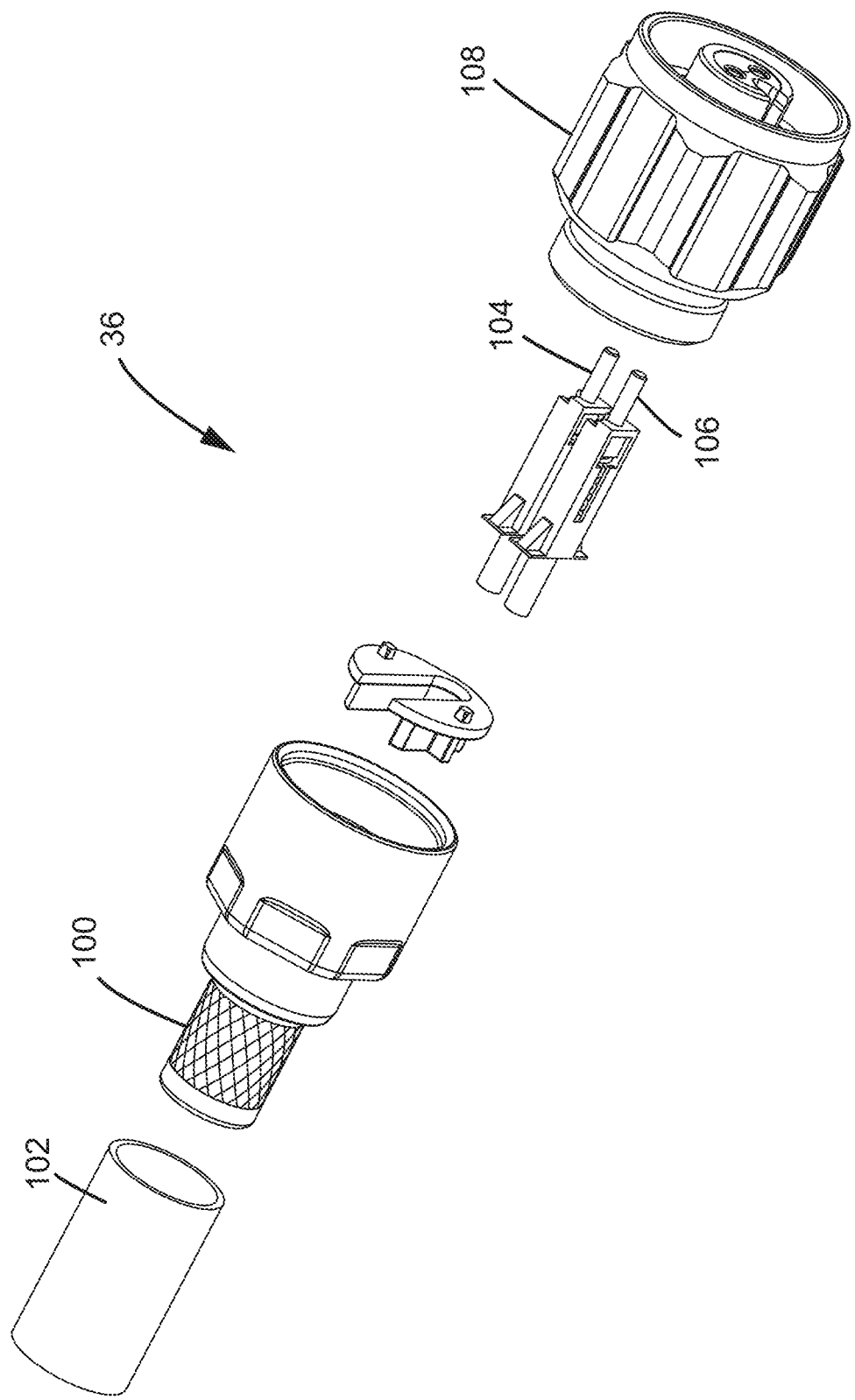
FIG. 8 is an exploded view showing an example hardened fiber optic connector suitable for use with the fiber optic jumper of FIG. 1.

FIG. 8 is an exploded view of the fiber optic connector 36 that mounts at the second end 26 of the fiber optic cable 22. The fiber optic connector 36 is depicted as a hardened fiber optic connector such as an ODC connector. In certain examples, the tensile reinforcing element 38 of the fiber optic cable 22 can be secured or anchored to the fiber optic connector 36 at a crimp location 100 by means such as a crimp sleeve 102. In other examples, the tensile reinforcing element 38 can be adhesively secured to the rear end of the fiber optic connector 36. In the depicted example, the fiber optic connector 36 includes a first ferrule 104 in which an end of the first optical fiber 30 is supported and a second optical fiber 106 in which an end of the second optical fiber 32 is supported. The rear end of the fiber optic connector 36 can be sealed relative to the fiber optic cable 22 by a gasket or by means such as a shape memory (e.g., heat-shrink) sleeve. The fiber optic connector 36 includes a twist-to-secure fastener 108 for securing the fiber optic connector 36 to a fiber optic adapter or to another fiber optic connector. The twist-to-secure fastener 108 can include an interface such as a bayonet-style interface, or a threaded interface adapted to interlock with a corresponding interface when the twist-to-secure fastener 108 is turned relative to a main body of the connector 36. In the depicted example, two separate ferrules are provided for supporting the ends of the optical fibers 30, 32. In other examples, a single ferrule having multiple fiber passages can be used for supporting the ends of the optical fibers 30, 32. Other hardened connector configurations that can be used with the fiber optic jumper 20 are disclosed by U.S. Pat. Nos. 8,556,520; 7,264,402; 9,304,262; 7,758,389; and 7,325,980, the disclosures of which are hereby incorporated by reference in their entireties.

What is claimed is:

1. A fiber optic jumper comprising:
   a fiber optic cable that extends between first and second cable ends, the fiber optic cable including a cable jacket containing at least first and second optical fibers;
   an optical transceiver module directly terminated at the first end of the fiber optic cable, the optical transceiver module comprising a printed circuit board including an edge defining a card edge connector electrical interface configured to receive a first electrical signal through a first electrical contact, and to transmit a second electrical signal through a second electrical contact, the printed circuit board further including an optical transmitter for converting the first electrical signal into a first optical signal, and an optical receiver for converting a second optical signal into the second electrical signal; and
   at least one fiber optic connector directly terminated at the second end of the fiber optic cable, the at least one fiber optic connector being a hardened fiber optic connector;
   wherein the fiber optic jumper is constructed of materials configured to enable operation of the fiber optic jumper at temperatures ranging from −40 to 70 degrees Celsius.

2. The fiber optic jumper of claim 1, wherein the optical transceiver module includes a connector body having a SFP form factor.

3. The fiber optic jumper of claim 2, further comprising an outer housing that at least partially surrounds the connector body.

4. The fiber optic jumper of claim 3, wherein the outer housing is adapted to fasten with respect to a connector receiver including a port for receiving the connector body to provide an electrical connection with the optical transceiver module.

5. The fiber optic jumper of claim 4, wherein an environmental seal is formed between the outer housing and the connector receiver.

6. The fiber optic jumper of claim 4, wherein the outer housing fastens to the connector receiver by a threaded connection, a bayonet-style connection, or a push-pull connection.

7. The fiber optic jumper of claim 1, wherein the fiber optic cable is environmentally sealed with respect to a rear end of the optical transceiver module.

8. The fiber optic jumper of claim 7, further comprising a shape-memory sleeve for providing sealing between the fiber optic cable and the rear end of the optical transceiver module.

9. The fiber optic jumper of claim 1, wherein the optical transceiver module is adapted to environmentally seal with respect to a connector receiver including a port for receiving a plug end of the optical transceiver module to provide an electrical connection with the optical transceiver module.

10. The fiber optic jumper of claim 1, wherein the optical transceiver module is configured to support 10 gigabit per second data rates.

11. The fiber optic jumper of claim 1, wherein the optical transceiver module is configured to support 25 gigabit per second data rates.

12. The fiber optic jumper of claim 1, wherein a tensile strength element of the fiber optic cable is anchored to a rear end of the optical transceiver module.

13. The fiber optic jumper of claim 1, wherein both the first and second optic fibers are supported at a single fiber optic connector having at least one ferrule.

14. The fiber optic jumper of claim 13, wherein the single fiber optic connector has a first ferrule for supporting the first optical fiber and a second ferrule for supporting the second optical fiber.

15. The fiber optic jumper of claim 1, wherein the fiber optic cable is sealed relative to the hardened fiber optic connector and a tensile strength element of the fiber optic cable is anchored to a rear end of the hardened fiber optic connector.

16. The fiber optic jumper of claim 15, wherein the hardened fiber optic connector includes a twist-to-secure fastener for securing the hardened fiber optic connector to a fiber optic adapter or another fiber optic connector.

17. The fiber optic jumper of claim 1, wherein a rear end of the hardened fiber optic connector is sealed relative to the fiber optic cable by a gasket.

18. The fiber optic jumper of claim 1, wherein a rear end of the hardened fiber optic connector is sealed relative to the fiber optic cable by a shape memory sleeve.

19. A fiber optic jumper comprising:
a fiber optic cable that extends between first and second cable ends, the fiber optic cable including a cable jacket containing at least first and second optical fibers;
an optical transceiver module directly terminated at the first end of the fiber optic cable, the optical transceiver module including a connector body having a SFP form factor;
at least one hardened fiber optic connector directly terminated at the second end of the fiber optic cable; and
an outer housing that at least partially surrounds the connector body, the outer housing being adapted to fasten with respect to a connector receiver including a port for receiving the connector body to provide an electrical connection with the optical transceiver module, wherein an environmental seal is formed between the outer housing and the connector receiver;
wherein the fiber optic cable is sealed relative to the hardened fiber optic connector and a tensile strength element of the fiber optic cable is anchored to a rear end of the hardened fiber optic connector, and wherein the hardened fiber optic connector includes a twist-to-secure fastener for securing the hardened fiber optic connector to a fiber optic adapter or another fiber optic connector.

20. The fiber optic jumper of claim 19, wherein the tensile strength element of the fiber optic cable is anchored to the rear end of the hardened fiber optic connector by a crimp sleeve.

21. A fiber optic jumper comprising:
a fiber optic cable that extends between first and second cable ends, the fiber optic cable including a cable jacket containing at least first and second optical fibers;
an optical transceiver module directly terminated at the first end of the fiber optic cable, wherein the fiber optic cable is environmentally sealed with respect to a rear end of the optical transceiver module, further comprising a shape-memory sleeve for providing sealing between the fiber optic cable and the rear end of the optical transceiver module, and wherein the optical transceiver module is adapted to environmentally seal with respect to a connector receiver including a port for receiving a plug end of the optical transceiver module to provide an electrical connection with the optical transceiver module; and
at least one fiber optic connector directly terminated at the second end of the fiber optic cable, the at least one fiber optic connector being hardened.

* * * * *